United States Patent
Miyagi et al.

[11] Patent Number: 5,114,508
[45] Date of Patent: May 19, 1992

[54] FILTER ELEMENT AND ITS PRODUCTION

[76] Inventors: Tokuya Miyagi, 1-14-35, Katsuyama Kita, Ikuno-ku, Osaka-shi, Osaka-fu; Akihisa Inoue, 3-53-402, Minamimachi, Gotenyama, Hirakata-shi, Osaka-fu; Taisuke Otsubo, 386, Oaza Uchiage, Neyagawa-shi, Osaka-fu; Yoshihiro Hori, 747-14, Yokosuna, Shimizu-shi, Shizuoka-ken, all of Japan

[21] Appl. No.: 77,031

[22] Filed: Jul. 21, 1987

Related U.S. Application Data

[63] Continuation of Ser. No. 812,320, Dec. 23, 1985, abandoned.

[30] Foreign Application Priority Data

Dec. 24, 1984 [JP] Japan .................. 59-279291
Dec. 24, 1984 [JP] Japan .................. 59-279292

[51] Int. Cl.$^5$ .............................. B32B 31/20
[52] U.S. Cl. ............................ 156/69; 156/218; 156/227; 156/283; 156/294; 156/295; 156/303.1; 156/309.6; 156/333
[58] Field of Search ............... 264/271.1, 273

[56] References Cited

U.S. PATENT DOCUMENTS

| | | |
|---|---|---|
| 2,720,323 | 3/1973 | Landre . |
| 3,133,847 | 5/1964 | Millington ............... 156/69 |
| 3,354,012 | 11/1967 | Forman et al. . |
| 3,457,339 | 7/1969 | Pall et al. . |
| 3,547,719 | 12/1970 | Kasten ............... 156/69 |
| 3,716,436 | 2/1973 | Pall ............... 156/303.1 |
| 3,752,321 | 8/1973 | McLaren . |
| 3,867,294 | 2/1975 | Pall et al. . |
| 3,946,136 | 3/1976 | Fitz et al. ............... 156/283 |
| 4,033,881 | 7/1977 | Pall . |
| 4,056,876 | 7/1977 | Lammermann ............... 156/69 |
| 4,114,794 | 9/1978 | Storms . |
| 4,154,688 | 5/1979 | Pall ............... 210/493.2 |
| 4,184,966 | 1/1980 | Pall . |
| 4,197,149 | 4/1980 | Feitag et al. ............... 156/333 |
| 4,248,924 | 2/1981 | Okita . |
| 4,290,889 | 9/1981 | Erikson . |
| 4,304,579 | 12/1981 | Granville . |
| 4,377,010 | 3/1983 | Fydelor et al. . |
| 4,392,958 | 7/1983 | Ganzi et al. . |
| 4,402,830 | 9/1983 | Pall . |
| 4,414,280 | 11/1983 | Silva et al. . |
| 4,419,241 | 12/1983 | Hoffmann . |
| 4,588,464 | 5/1986 | Miyagi et al. ............... 156/69 |
| 4,663,041 | 5/1987 | Miyagi et al. . |

FOREIGN PATENT DOCUMENTS

| | | |
|---|---|---|
| 541171 | 5/1957 | Canada ............... 156/69 |
| 701335 | 1/1965 | Canada . |
| 0062867 | 10/1982 | European Pat. Off. . |
| 0139822 | 5/1985 | European Pat. Off. . |
| 0175432 | 3/1986 | European Pat. Off. . |
| 3444387 | 1/1984 | Fed. Rep. of Germany . |
| 51-16475 | 5/1976 | Japan ............... 156/69 |
| 54-58269 | 5/1979 | Japan . |
| 54-116779 | 9/1979 | Japan . |
| 55-11024 | 1/1980 | Japan . |
| 57-110310 | 7/1982 | Japan . |
| 57-128312 | 8/1982 | Japan . |
| 58-14919 | 1/1983 | Japan . |
| 58-24311 | 2/1983 | Japan . |
| 58-98111 | 6/1983 | Japan . |
| 59-62323 | 4/1984 | Japan . |
| 59-42016 | 10/1984 | Japan . |
| 1408804 | 10/1975 | United Kingdom ............... 156/69 |
| 2152399 | 8/1985 | United Kingdom . |

*Primary Examiner*—Jenna L. Davis
*Attorney, Agent, or Firm*—Ostrolenk, Faber, Gerb & Soffen

[57] ABSTRACT

The present invention provides a filter element made wholly of fluorocarbon resin and production thereof. As the filter element is wholly made of fluorocarbon resin, it has an excellent chemicals resistance, and temperature resistance and is free from metal leaching. Though it has been difficult to produce such a fluorocarbon filter element free from leakage, in the present invention it can be produced at high yield.

13 Claims, 3 Drawing Sheets

FILTER ELEMENT AND ITS PRODUCTION

This application is a continuation of application Ser. No. 812,320, filed Dec. 23, 1985, now abandoned.

BACKGROUND OF THE INVENTION

In recent years, super-clarification techniques for air, gases, water, chemicals, etc. based on the membrane separation techniques have made a remarkable progress and are widely used in various fields such as the fields of foods, semi-conductors and the like. Particularly, a chemicals clarification technique required for fine processing in the process for producing semi-conductor integrated circuits is behind in technical response as compared with the clarification technique for air, gases, water, etc., and it is recently attracting a special attention. As one of the main reasons for that, while increasing the purity of chemicals is being required in attaining an improvement in the yield and quality of products, both semi-conductor integrated circuit manufacturers and chemicals suppliers are behind in their technical response, there is given delay in the development of filter products which are less in metal leaching and good in chemicals resistance. As filters which meet the above requirements at present, ones made wholly of fluorocarbon resins are being required, and membrane filters of a multi-flat membrane system and a tubular form have been developed. But, these filters have not yet come to satisfy the needs of the market, because both effective filter area and flow rate of filtration are so small that there are caused problems in filtration of highly viscous chemicals and mass treatment.

On the other hand, a pleat-form filter element with fluorocarbon resin membranes has been developed. This filter element has a large effective filter area as well as a fairly superior chemicals resistance, but because of the adhesion of fluorocarbon resin being very difficult in itself, parts other than the filter membrane are made of materials other than fluorocarbon resin which are not sufficient in terms of chemicals resistance, temperature resistance and metal leaching.

Consequently, satisfactory products are not yet obtained.

Further, a filter employed in the foregoing process for producing semi-conductor integrated circuits requires pores as very fine as 0.01 to 10 $\mu$m. Also, the filter membrane itself is very low in strength, so that severe conditions cannot be employed on filter production, and besides the members of the filter element must be assembled not by mere adhesion, but by strong adhesion in a completely sealed state.

In U.S. Pat. No. 3,457,339 Pall proposes a process for applying end caps to filter tube by liquefying an inside face of a thermoplastic end cap by about 10 to 90% of the thickness of the end cap while cooling the outside face of the thermoplastic end cap. However, though this method is useful for the production of filter element of thermoplastic resin having a low viscosity such as about 50 c.p., it is not applicable to a thermoplastic resin having a high melting point and a high viscosity such as fluorocarbon resin, because if the filter sheet material (filter tube) is inserted into the cap, the inside of the cap cannot be heated, and then the temperature of the sheet is lowered and the viscosity increases to cause the pleats to buckle thereby making it impossible for resin to enter the pleats. Pall, further, suggests in U.S. Pat. No. 4,154,688 the welding of the filter sheet material to an end cap of fluorocarbon resin such as Teflon (polytetrafluoroethylene) according to his prior Patent. However, as stated that these are more difficult to bond, Teflon is not fluid even at the temperature above melting point, so that it can not be welded with filter sheet material according to his prior Patent.

Formerly Miyagi, Inoue, Hamada, Fujimogi and Hori invented a filter element made wholly of fluorocarbon resin and production thereof (Japanese Patent Application No. 167202/1983, U.S. patent application No. 608,309 now U.S. Pat. No. 4,588,464 which issued May 13, 1986). In this application in order to weld pleats with an end cap liquid-tightly the both end parts of the pleats are pre-welded, and then after cooling the welded part is inserted into a melted fluorocarbon resin in a mold to force the resin into the spaces of pleats, after which end parts are fitted into end caps. This method needs the pre-welding of the end part of the pleat.

SUMMARY OF THE INVENTION

The present invention relates to a production of a filter element made wholly of fluorocarbon resin, which is sealed at the end part by a thermoplastic fluorocarbon resin, wherein a pleat is slowly inserted into a melted thermoplastic fluorocarbon resin to force the resin into the pleats without the pre-welding to make a liquid-tightly welded end part, which is used as a filter element as it is or used as furnished with an additional end cap made of fluorocarbon resin, housing or anti-corrosive metal cap.

DETAILED DESCRIPTION OF THE INVENTION

Figure 1:
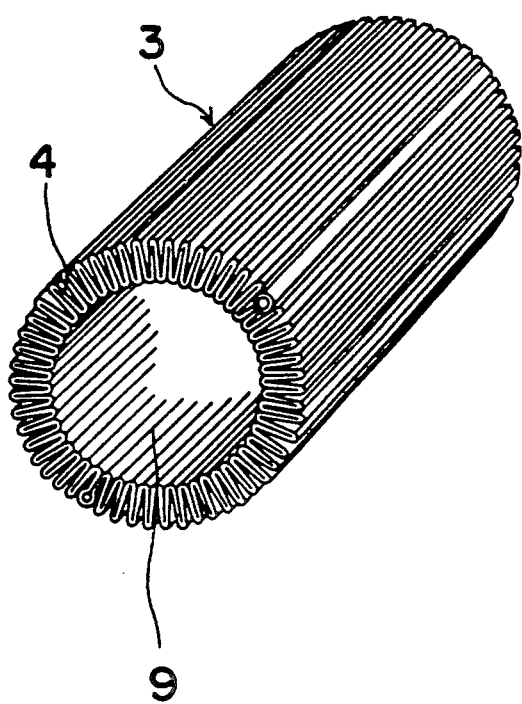
FIG. 1 is a schematic view of a cylindrical pleated the filter material of the present invention.

The present invention relates to a production of filter element made wholly of fluorocarbon resin and a filter element produced thereby.

According to the present invention, as showed in FIGS. 1-5, it is provided a process for production of the filter element made wholly of fluorocarbon resin which comprises putting net supporters (2) of a thermoplastic fluorocarbon resin on both sides of a filter membrane (1) of a fluorocarbon resin, forming a pleated sheet, shaping it into a cylindrical form, liquid-tightly welding the edge parts of the adjacent both sides of the pleated sheet, inserting an obtained cylindrical pleated filter material (referred to as filter material hereinafter) (3) into a melted thermoplastic fluorocarbon resin maintained at a temperature more than the melting point thereof at a rate of not more than 6 mm/minute, and heat-welding the both. The term "thermoplastic fluorocarbon resin" does not include tetrafluoroethylene resin through the present specification.

The feature of the present invention is in that the filter element is composed of a fluorocarbon resin, and the fluorocarbon resin which has been considered difficult to be welded is liquid-tightly welded without pre-welding to give a filter element made wholly of fluorocarbon resin.

The filter membrane (1) used in the present invention is made of a fluorocarbon resin selected from tetrafluoroethylene resin (hereinafter referred to as PTFE), tetrafluoroethylene copolymer, fluorovinylidene resin (hereinafter referred to as PVdF) and the like. Most preferable one is PTFE in terms of chemical resistance, temperature resistance and metal leaching. It may be laminated with a porous reinforcing material made of a fluorocarbon resin. This membrane itself is well known as a filter membrane. Relating to the thickness of the membrane and the diameter of the pore, it suffices to optionally select them according to the kind of liquids to be treated and the object of filtration. Generally, however, membranes of 50 to 200 μm in thickness and 0.01 to 10 μm in pore diameter are used. This membrane is low in mechanical strength and easily deformed by filter pressure so that, in order to keep the pleat form, the membrane is used in the form of a sandwich in which thermoplastic fluorocarbon resin net supporters are superimposed on the both surfaces of the membrane. As the filter sheet material, for example a sheet material produced by welding a fluoroethylene polymer onto the surface of glass fibers, as described in Japanese Patent Application Kokai (Laid-open) No. 14919/1983, has an increased strength, but no fine pores. Besides, it is not sufficient in terms of chemicals resistance, metal leaching etc., not meeting the object of the present invention. Such sheet material, therefore, cannot be used. Additionally the heat-welding of the filter membrane and the end cap is effected under a high inserting pressure. In the case of the filter membrane being made wholly of fluorocarbon resin the high inserting pressure distorts the filter membrane not to weld liquid-tightly the both. In the above case the reason why the end part can be sealed is that a high inserting pressure can be applied because of the use of glass fiber.

The filter membrane of a fluorocarbon resin, especially PTFE, is placed between thermoplastic fluorocarbon resin net supporters (2) in a sandwich form. These supporters are a spacer for the filter membrane to act effectively over the whole area on filtration, and at the same time, they prevent the membrane from deformation in the process producing a filter element and by filtration pressure. Besides, they play an important role to ensure the welding of the edge parts of the both sides of the membrane, and the end part of filter material. Fluorocarbon resin, especially PTFE, a material for the filter membrane, is very difficult to be thermally welded and very low in membrane strength, so that it is difficult to liquid-tightly weld the both end parts (4) by a fluorocarbon resin. This may be considered to be one of the reasons for that cylindrical filter elements made wholly of a fluorocarbon resin have not so far been provided.

As a material for the net supporter (2), there are used thermoplastic fluorocarbon resins such as tetrafluoroethylene/perfluoroalkyl vinyl ether copolymer resin (hereinafter referred to as PFA), tetrafluoroethylene/hexafluorooropylene copolymer resin (hereinafter referred to as FEP), ethylene/tetrafluoroethylene copolymer resin (hereinafter referred to as ETFE), trifluorochloroethylene resin (hereinafter referred to as PCTFE), ethylenetrifluorochloroethylene copolymer resin (hereinafter referred to as ECTFE), fluorovinylidene resin (hereinafter referred to as PVdF), fluorovinyl resin (hereinafter referred to as PVF), tetrafluoroethylene/hexafluoropropylene/perfluoroalkyl vinyl ether terpolymer resin (hereinafter referred to as EPE), fluorine-containing thermoplastic elastomer and the like. Particularly preferred ones are PFA, FEP and EPE in terms of chemicals resistance and temperature resistance. More particularly, the same resin as a resin for welding the end part is preferable.

The net supporter is porous materials such as plain woven fabrics, welded non-woven fabrics, formed nets, knitting goods, punching sheets and the like of thermoplastic fluorocarbon resin fibers. Preferably, the supporter has flexibility and rigidity of such a degree that it is not deformed easily by filter pressure. For this reason, supporters of 0.1 to 1.0 mm in thickness and of about 0.1 to about 5 mm$^2$ in pore area are generally used.

The filter membrane is places between the net supporters in a sandwich form folded in pleats and welded liquid-tightly at the edge parts of the both sides into a pleat-form cylinder. The filter membrane and the net supporter may form a multi-layer structure (for example, supporter - membrane - supporter - membrane - supporter).

Figure 3:
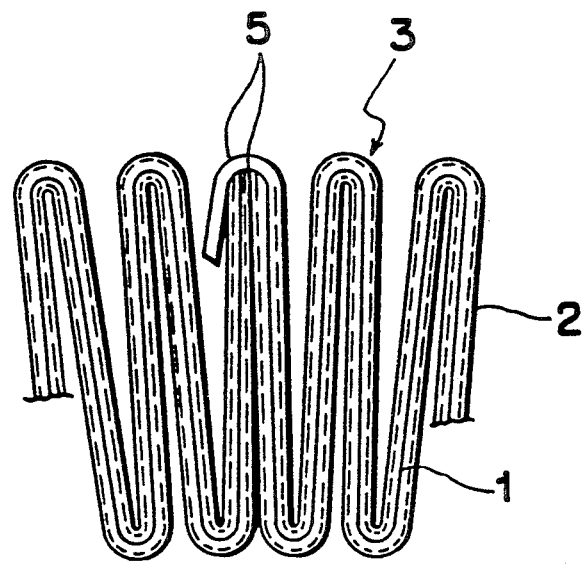
FIGS. 3-5 are views illustrating embodiments to weld the edge parts of the both sides of the pleat.
Figure 4:
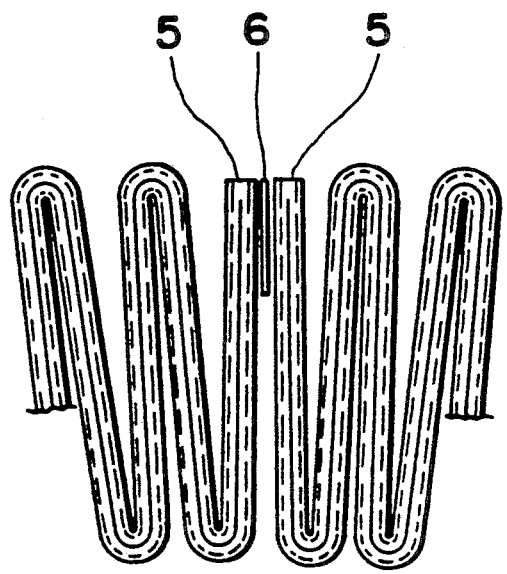
Figure 5:
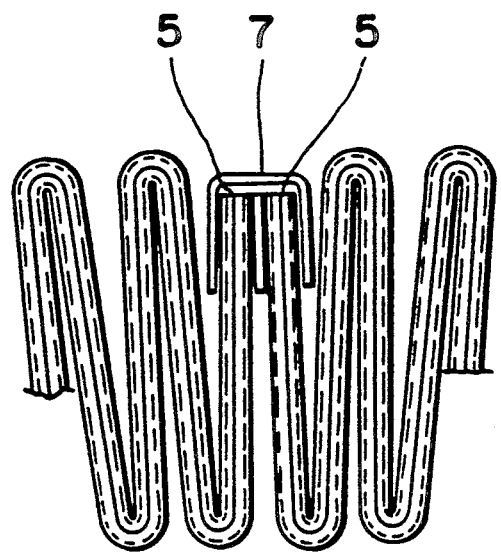

The edge parts (5) of the both sides may be welded together, for example, by lengthening the edge part of one side of the sheet, externally covering the edge part of the other side with the lengthened edge part and integrally welding the both edge parts, as shown in FIG. 3; by placing a sealing tape (6) made of a thermoplastic fluorocarbon resin between said edge parts, followed by integrally welding, as shown in FIG. 4; or by covering the edge parts with a sealing cover (7) made of a thermoplastic fluorocarbon resin, followed by integrally welding, as shown in FIG. 5. As these sealing tape and sealing cover, PFA, FEP, EPE, etc. superior in chemicals resistance and weldability are preferred. In the embodiments shown in FIGS. 4 and 5, the pressure resistance of the seal improves.

The filter material obtained is sealed with a thermoplastic fluorocarbon resin at the both end parts.

Figure 7:
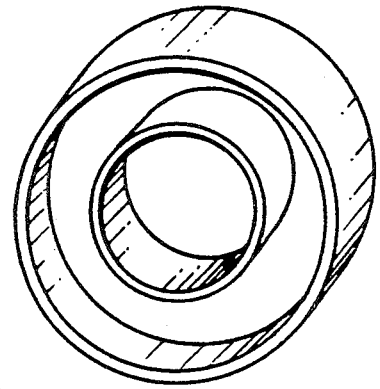
FIG. 7 is a schematic view of an end cap having a central opening.
Figure 2:
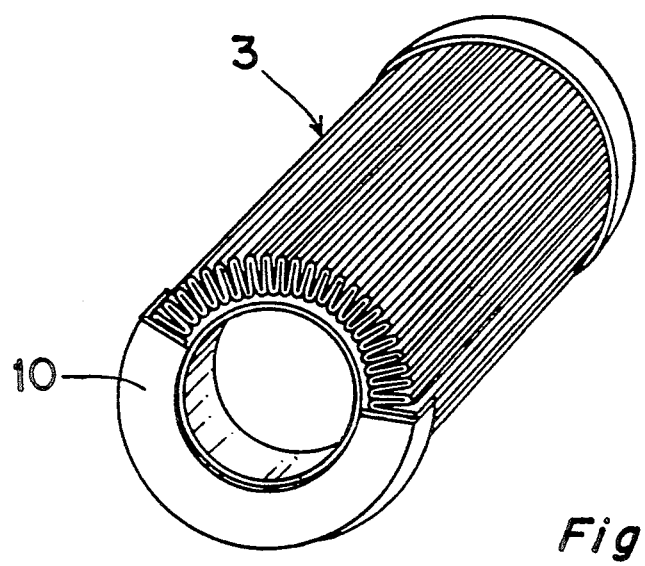
FIG. 2 is a schematic view of filter element.
Figure 6:
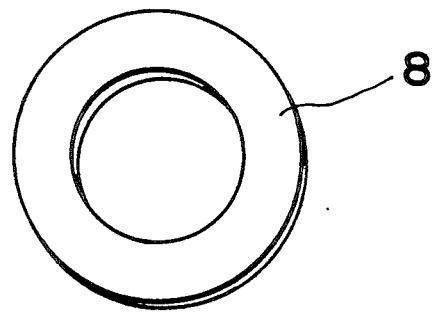
FIG. 6 is a view of a ring sheet made of thermoplastic fluorocarbon resin for sealing end parts.

For welding, a thermoplastic fluorocarbon resin ring (8) for sealing the end part (FIG. 6) may be inserted into a mold, which is fitted to the end part of filter material (for example, the mold having the same shape as the end cap of FIG. 7). The ring is melted, to which the end part of the filter material is inserted. A rate of insertion of the end part into the melted resin should be not more than 6 mm/minute, preferably 0.1 to 6 mm/minute, especially 0.2 to 2 mm/minute. At that time, heating is continued to maintain the temperature of the melted resin above the melting point and when the temperature of the melted resin is lowered by the insertion, it is better to forced the filter material into the resin within the aforementioned rate after the resin was melted again. According to other modifications the end part of filter material as well as the ring may be simultaneously inserted into the mold, and then the mold is heated to melt the ring, after which the end part is slowly forced into the melted resin. The latter may be effected according to the aforementioned condition. Fluorocarbon resins for seal tape or seal cover include PFA, FEP, EPE, ETFE, PCTFE, ECTFE and the like, especially PFA, FEP and EPE. The sealing as illustrated in FIGS. 4 and 5 shows an excellent pressure resistance. An obtained filter material is sealed at the both end part using a thermoplastic fluorocarbon resin. In the case that the melting point of the filter membrane is higher than the resin for welding the end part, it is preferable that the end part of the filter material is inserted into a mold in which a thermoplastic fluorocarbon resin is previously inserted, and is heated with the thermoplastic fluorocarbon resin in the mold as slightly supported. By the above process a rapid drop of temperature of the melted resin caused by the insertion of the end part of the filter material can be prevented.

The insertion may be achieved by putting a constant weight on the top of the filter material (preferably 1 to 100 g per 1 cm$^2$ of the end part area) or by forcing it at a constant rate. The time for the insertion is, though different to the kinds of resin melted, generally not less than 30 seconds/1 mm depth, or more preferably one minute/1 mm depth.

The mold is cooled, after the filter material sunk into the melted resin in the mold to a given depth, for instance, about 1-10 mm.

For the sealing of end part of the filter material powder of a thermoplastic fluorocarbon resin may be used. In this case, the thermoplastic fluorocarbon resin powder is charged into a mold which is fitted to the end part of filter material, the end part is forced to the powder in the mold, the powder is inserted into the spaces of the pleat, the mold is heated over the melting point of the powder to liquid-tightly weld the end part with the melted resin, and then resultant is cooled. It is preferable to hold the filter material, lest it should fall down by its own weight. Using a heat-shrinkable material for a filter or a net, the filter material is preferably forced into the resin after the powder was melted.

When it is difficult to force the powder into the spaces of pleat, suitable wetting agents, for example, ethanol may be used.

A dispersion of a thermoplastic fluorocarbon resin may be used for the sealing of the end part. The welding may be achieved according to a manner as described just above. If the concentration of the dispersion is dilute so that the end part can not be liquid-tightly welded, two or more welding process may be applied. Usually, a dispersion of thermoplastic fluorocarbon resin content being about 30 to 70 percent by weight may be generally used. Using the dispersion, after a solvent is evaporated at a low temperature, the resin may be preferably heated over the melting point.

The thermoplastic fluorocarbon resin suitable for sealing the end part of the filter material includes PFA, FEP. ETFE, PCTFE, ECTFE, PVdF, PVF, EPE, fluorine containing thermoplastic elastomer, and other fluorin containing copolymer. PFA, FEP, EPE, ETFE, PCTFE or ECTFE, especially PFA, FEP or EPE are preferable for their excellent resistivity to chemicals and heat resistance. PTFE is not suitable because of high melt viscosity and low weldability and so the insertion of the end part is impossible. Suitable temperature for melting are as follows: PFA: 310°-400° C., especially 315°-350° C., EPE: 300°-400° C., especially 305°-350° C., FEP: 280°-350° C.

The resin for welding the end part may be used at an amount such that the thickness of the sealed end part is about 1 to 10 mm, especially about 3 to 6 mm.

These welding of the end part of filter material by the resin for sealing are achieved, if desired, by inserting a porous tube core (passage of filtrate) into the central opening of filter material and then simultaneously welding. Suitable fluorocarbon resin for the porous tube core is preferably made of PTFE, FEP, PFA, EPE, ETFE, PCTFE, ECTFE, and so on, especially, PTFE, FEP, PFA, and EPE for their excellent chemicals resistance and temperature resistance. Particularly, the same resin as a resin for welding the end part is preferable.

The filter element produced according to the above process, which has no end caps, can be used as it is, but it is better to be incorporated with suitable end caps, because uneven surface and bubble often rise to spoil the appearance, and when inserting it into a housing, the unevenness possibly causes leakage. As the end cap stainless steal, hasteroy, X-alloy, H-alloy, duranickel and the like other than fluorocarbon resin according to the purpose may be used. Especially, fluorocarbon resin is preferable to filter chemicals sensitive to metal ion such as the field of semiconductor industry. Suitable fluorocarbon resin for an end cap is for example PTFE, FEP, PFA, EPE, ETFE, PCTFE, and ECTFE, especially PTFE, FEP, PFA, and EPE because of their excellent chemical resistance and temperature resistance. More preferably, the same resin as used for sealing the end part is used.

The connection of the end cap (10) of fluorocarbon resin with the welded end part of the filter material is preferably achieved by welding processes.

As the welding processes there are included a hot melt welding, a rolling welding, a insert injection, cylinder impregnation and the like. In the case of hot melt welding the fluorocarbon resin end cap which is previously molded to a desirable shape is fixed to the welded end part to be inserted into a mold, which is heated at a temperature more than the melting point of the welding thermoplastic fluorocarbon resin of the end part, more preferably, more than the melting point of the end cap to weld liquid-tightly and completely the whole side wall and/or bottom of the end cap.

In the present invention, as resinous materials for the sealing an end cap may be used to be directly welded with the end part of filter material. At that time the aforementioned end part of the filter material may be fitted with the end cap, if desired, with a porous tube core (filtrate pass), and these are set in the mold for the end cap and the end cap is melted by heating the mold over the melting point of the end cap, and then the above end part of the filter material is slowly inserted into the melted thermoplastic fluorocarbon resin of the end cap as maintaining the above temperature to be welded. The rate of sinking of filter material may be not more than 6 mm/minute, preferably 0.1 to 6 mm/minute, more preferably 0.2 to 2 mm/minute. At the insertion the filter material may be slightly supported by holder till the end cap is sufficiently melted, and when the cap is sufficiently melted, the filter material may be slightly weighed, for example, by 1 to 100 g/cm$^2$ to sink slowly into the melted end cap as heating. As other method the filter material may be inserted as a constant rate. The mold is cooled, after the filter material sunk into the melted end cap in the mold a given depth. According to the above process the end cap resin is impregnated into the spaces of pleat at end part of the filter material, so that the end part can be liquid-tightly sealed. This method is applicable, when the melting point of filter membrane is higher than that of end cap.

As another method, an end cap is previously melted in a mold, into which an end part of the filter material is slowly inserted to be welded. When the temperature of the end cap falls by the insertion of end part of the filter material, it is inserted at an aforementioned rate when the temperature of the end cap rises again over melting point thereof, or a given weight is applied to the top of filter material to force the end part into the end cap as aforementioned. Both end caps to be welded to end parts may have openings, or one may have an central opening and the other may not have it. The bottom thickness of the end cap is preferably about not less than 1.5 mm, more preferably 3 to 8 mm.

With the filter element of the present invention, the outside of the filter material may be covered with a cylindrical protective jacket made of a fluorocarbon resin, if desired. This protective jacket may be made of a panel having a number of pores for a liquor to be treated to pass therethrough, and it need not always be integrally welded with the filter element. The jacket may be fitted to the inside of the cap, or to the outside of the cap.

The filter element of the present invention is made wholly of a fluorocarbon resin, so that it is superior in chemical resistance, temperature resistance and cause no problems of metal leaching, etc. Besides, it is possible to filter a liquid to be treated containing contaminants as very fine as 0.1 μm and so, and therefore, the filter element is particularly useful in clarifying chemicals, etc. used in a process for producing semi-conductor integrated circuits.

The present invention will be illustrated with reference to the following example.

EXAMPLE 1

A sandwich-form sheet comprising a PTFE filter membrane (thickness, 100 μm; average pore diameter, 0.1 μm; area, 250×2000 mm$^2$) and EPE net supporters (average thickness, 0.4 mm; rate of pore area, 50%; area 250×2000 mm$^2$) superimposed above and below said filter membrane, is formed into a 70-pleated sheet.

The pleated sheet is shaped into a tube, which edge parts of the both sides are placed one upon the other, and an EPE film (width, 5 mm; length, 250 mm; thickness, 50 μm) is inserted between them (FIG. 4). The edge parts are then heat-welded by means of a commercially available impulse sealer to obtain a cylindrical pleat-form filter material (internal diameter, 36 mm; largest external diameter, 65 mm; length, 250 mm). This heat-welded part has a completely liquid-tight seal.

A porous tube core made of PFA (external diameter 36 mm, internal diameter 30 mm, length 240 mm) is inserted into the inside of the above filter material, the end part is tightly fixed into an end cap of EPE (thickness of the bottom is 6 mm), these are set in the mold for the end cap, and then the end cap is melted by heating the mold, while the filter material is slightly supported by a holder. After heated for 20 minutes at 320° C., an under end part of the filter material is slowly sunk into the melted resin of the end cap as heating by putting a weight of 200 g on the filter. When the filter material is sunk into the end cap up to about 5 mm (about 10 minutes are spent), the weight is removed, and then the filter material is cooled.

After the melted resin is set, the filter material is taken out. The resin of the end cap is impregnated into the spaces of pleat to be strongly welded. As to the other end part is treated by the same manner.

The obtained filter element is liquid-tightly sealed at the edge parts of the pleated sheet, end parts and end caps, which has no leakage and is resistible to a high pressure such as even more than 5 kg/cm$^2$.

EXAMPLE 2

A sandwich-form sheet comprising a PTFE filter membrane (thickness, 100 μm, average pore diameter 0.22 μm, area 250×2000 mm$^2$) and PFA net supporter (average thickness 0.4 mm, rate of pore area 50%, area 250×2000 mm$^2$) superimposed above and below said filter membrane, is formed into a 70-pleated sheet.

The pleated sheet is shaped to a cylindrical form, the both edges of the sheet is placed one upon the other, and an PFA film (width 5 mm, length 250 mm, thickness 50 μm) is inserted between them (FIG.4). The edge parts are then heat-welded by means of a commercially available impulse sealer to obtain a cylindrical pleated filter material. This heat-welded part is completely liquid-tightly sealed.

Separately from this, into a circular mold fit for the end part is inserted a ring of PFA sealing material (thickness 5 mm, internal diameter 38 mm, external diameter 65 mm), and the mold is heated at 320° C. for 10 minutes to melt the PFA sealing material, into which the above filter material is inserted as slightly supported with a holder. On the upper end part of the filter material the weight of 200 g is put to sink slowly the other (under) end part of filter material into the melted ring of sealing material with heating. When the filter material is sunk by about 5 mm depth (about 10 minutes are spent), the weight is removed and then the material is cooled.

The resin for the seal (ring sheet) is impregnated into the spaces of the pleat of filter material at the end part, and the net supporter is also melted to form a completely welded and sealed end part. The other end part is welded by the same manner. Into the filter material a porous tube core of PFA (external diameter 36 mm, internal diameter 30 mm, length 250 mm) is inserted, and then heat-welded with PFA end caps having a given shape. The filter element obtained has a high sealing ability and a resistance to high pressure such as more than 5 kg/cm$^2$.

EXAMPLE 3

A pleated cylindrical filter material is obtained as the same manner as Example 2. A ring of sealing material made of PFA (thickness 5 mm, internal diameter 38 mm, external diameter 65 mm) is placed in a circular mold fit for the end part, on which an end part of the filter material is put, and the filter material is slightly supported by a holder vertically. After the mold was heated at 320° C. for 15 minutes, the filter material is sunk by 5 mm at a rate of 0.5 mm/minute to be forced into the melted resin in the mold as heating and then cooled. After the melted resin set, the end part is taken out to give a filter element, in which the resin of the sealing material is impregnated into the spaces of the pleat at the end part and net supporter is also welded to one body. The other end part is welded by the same manner.

EXAMPLE 4 method of using a powder

A pleated filter material is obtained as the same manner as Example 2. PFA powder 25 g is charged in a circular mold fitted for the end part, into which an end part of the filter material is forced to insert the powder between the spaces of pleat of the end part. The filter material is vertically held while the mold is heated at 325° C. for 25 minutes to melt the powder and the net supporter, and weld them to one body, and then cooled.

After the resin sets, the welded material is taken out to give a filter element which is completely sealed at the end part of the filter membrane. The other end part is treated by the same manner to give a filter element.

The filter element without end cap as obtained in Examples 3 and 4 may be welded with end cap as the same manner as described in Example 2 to give a filter element having an excellent pressure resistance, for instance, more than 5 kg/cm². The appearance of welded end part of the obtained filter material is excellent.

What is claimed is:

1. A method of producing a filter element made wholly of a fluorocarbon resin which comprises superimposing a net supporter made of thermoplastic fluorocarbon resin on both sides of a 0.01 to 0.22 μm pore diameter filter membrane made of fluorocarbon resin, pleating the resulting sandwich form sheet, bending the pleated sheet to cylindrical form, forming a seam in the cylinder by liquid-tightly welding the longitudinal edge parts of adjacent sides of the sheet, inserting slowly an end part of the obtained cylindrical pleated filter material endwise into melted thermoplastic fluorocarbon resin to a depth of 1-10 mm in a mold maintained at a temperature above the melting point of said melted fluorocarbon resin without pre-welding the pleats, at a rate of not more than 6 mm/minute to force the melted resin into spaces between the pleats at the end part, and to embed the filter sheet end part in the resin, and thereafter cooling the filter material to allow the melted resin to set, thereby welding for sealing the end part of the filter material.

2. A method of claim 1, in which the filter membrane is made of PTFE.

3. A method of claim 1, in which the net supporter is made of PFA, FEP or EPE.

4. A method of claim 1, in which the resin for sealing the end parts is PFA, FEP, EPE, PCTFE, ECTFE or ETFE.

5. A method of claim 1, in which the rate of the insertion is 0.1 to 6 mm/minute.

6. A method of claim 1, in which the welding is achieved by setting the end part and the resin for welding in a mold simultaneously, melting the resin for welding, and forcing the end part into the melted resin.

7. A method of claim 1 wherein a protective core made of fluorocarbon resin is affixed inside the cylindrical pleated filter material prior to inserting an end part thereof into said melted thermoplastic fluorocarbon resin.

8. A method of claim 1 wherein the welded end parts are further welded to end caps.

9. A method of claim 1, in which the insertion of the end part of the filter is effected under a pressure of 1-50 g/cm².

10. A method of producing a filter element made wholly of a fluorocarbon resin which comprises superimposing a net supporter made of thermoplastic fluorocarbon resin or both sides of a filter membrane made of fluorocarbon resin to form a pleated sheet, bending the pleated sheet to cylindrical form, liquid-tightly welding the edge parts of adjacent sides of the sheet, inserting an end part of the obtained cylindrical pleated filter material, without pre-welding the pleats into a thermoplastic fluorocarbon resin powder previously charged into a mold which is fitted to the end part of filter material, so that the powder is inserted into the spaces of the pleat at the end part, heating the mold to melt the powder and the net supporter of the end part whereby welding the end part by the melted resin, and then cooling them.

11. A method of claim 10, in which the filter membrane is made of PTFE.

12. A method of claim 10, in which the net supporter is made of PFA, FEP or EPE.

13. A method of claim 10, in which the resin powder is PFA, FEP, EPE, PCTFE, ECTFE or ETFE.

* * * * *

UNITED STATES PATENT AND TRADEMARK OFFICE
CERTIFICATE OF CORRECTION

PATENT NO. : 5,114,508
DATED : May 19, 1992
INVENTOR(S) : Tokuya Miyagi et al.

It is certified that error appears in the above-identified patent and that said Letters Patent is hereby corrected as shown below:

```
    Column 2, line 17, after "which" read --the-- and line
49, for "showed" read --shown--.

Column 4, line 15, for "places" read --placed--.

Column 5, line 45, for "." read --,--.

Column 6, line 51, for "as" read --at--;
              line 53, after "mold" read --to--;
              line 68, for "an" read --a--.
```

Signed and Sealed this

Twenty-first Day of September, 1993

Attest:

BRUCE LEHMAN

*Attesting Officer*     *Commissioner of Patents and Trademarks*